(12) United States Patent
Saito et al.

(10) Patent No.: US 7,681,984 B2
(45) Date of Patent: Mar. 23, 2010

(54) IMAGE READING AND RECORDING APPARATUS

(75) Inventors: Tetsuya Saito, Yokohama (JP); Atsushi Yokomizo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 399 days.

(21) Appl. No.: 11/831,206

(22) Filed: Jul. 31, 2007

(65) Prior Publication Data

US 2008/0049068 A1    Feb. 28, 2008

(30) Foreign Application Priority Data

Aug. 23, 2006  (JP) .............................. 2006-226350

(51) Int. Cl.
*B41J 23/00* (2006.01)
(52) U.S. Cl. ............................ 347/37; 347/2
(58) Field of Classification Search ...................... 347/2, 347/37, 40, 108, 129
See application file for complete search history.

(56) References Cited

U.S. PATENT DOCUMENTS 5,777,634 A * 7/1998 Okamura et al. ............... 347/7

2007/0019252 A1   1/2007 Ogushi et al. ............... 358/474

FOREIGN PATENT DOCUMENTS

| JP | 2004-82478 A | 3/2004 |
|----|----|----|
| JP | 2005-74659 A | 3/2005 |

* cited by examiner

*Primary Examiner*—Thinh H Nguyen
(74) *Attorney, Agent, or Firm*—Fitzpatrick, Cella, Harper & Scinto

(57) ABSTRACT

A scanner unit is revolvable disposed to a recording unit. The recording unit and the scanner unit are coupled with each other with a damper unit including a holder, a rod, and a spring. The damper unit is disposed so that the operating direction of the spring switches in process of the opening and the closing of the scanner unit. A guiding surface capable of abutting on the projection disposed on the rod is provided in the recording unit. The projection abuts on the guiding surface before the operating direction of the spring switches in process of the movement of the scanner unit from its opened position to its closed position.

7 Claims, 8 Drawing Sheets

IMAGE READING AND RECORDING APPARATUS

BACKGROUND OF THE INVENTION

1. Field of the Invention

The present invention relates to an image reading and recording apparatus composed of combining a recording unit and a scanner unit, and more particularly to a mechanism for opening and closing a scanner unit to a recording unit.

2. Description of the Related Art

There has been conventionally an image reading and recording apparatus composed of combining a recording apparatus and a scanner. The recording apparatus here records an image onto a recording material with a recording head based on image information. The scanner reads an image on an original with a reading unit, such as a CCD, and outputs the read image signal. An image reading and recording apparatus is generally adapted to mount a scanner unit on a recording unit, which is a recording apparatus, in the state capable of opening and closing the scanner unit. The image reading and recording apparatus is adapted to move the scanner unit upward for maintenance, such as an exchange of a recording head or an ink tank of the recording unit and a removal of jammed paper.

In the image reading and recording apparatus like this, the scanner unit capable of being opened and closed constitutes a cover unit capable of being opened and closed for covering an opened portion of a main body apparatus unit for performing the maintenance. At the time of performing a maintenance operation, it is necessary to open the scanner unit and to hold the scanner unit in the opened state. Consequently, an opening and closing mechanism for that is needed. Moreover, a mechanism for decelerating the cover unit for safety reasons lest the cover unit vigorously closes in process of closing the opened portion of the main body apparatus unit is also needed. Moreover, an assist mechanism for reducing an operating force at the time of opening the cover unit and a lock mechanism for locking the cover unit in a closed state are sometimes needed.

However, if these mechanisms are separately included, then the enlargement of the apparatus main body in size and an increase in cost owing to the increase of the number of parts are brought about. Accordingly, a mechanism was proposed which included the function of holding a cover unit in the opened state, the function of decelerating the cover unit in process of closing, the power assist function of reducing the operating force at the time of opening the cover unit, and the lock function of holding the cover unit in the closed state.

FIG. 7 is a side view illustrating a conventional image reading and recording apparatus in the state of closing a cover unit thereof. FIG. 8 is a side view illustrating the state of a damper unit when the cover unit is closed. FIG. 9 is a side view illustrating the state of the damper unit when the cover unit is opened. FIG. 10 is a side view illustrating the state of the damper unit in the process of opening the cover unit.

In FIGS. 7, 8, 9 and 10, a scanner unit 103 is attached to a frame 102 constituting the upper housing of a recording unit 120 with a rotating shaft 103b in the state capable of being opened and closed. A damper unit 110 is coupled between the frame 102 and the scanner unit 103. The damper unit 110 includes a holder 104 and a rod 105, which are assembled so that they each can slide in the expansion and contraction direction thereof, and a compression spring 108 mounted between the holder 104 and the rod 105 in a retractable state. The holder 104 is revolvably supported by a holding case 106, which is fixed to the frame 102, with a rotating shaft 104a.

The rod 105 is coupled to a fitting hole 103a of the scanner unit 103 with a fitting shaft 105a at an end of the rod 105. The compression spring 108 operates on the rod 105 to extend the rod 105 to the left direction in FIG. 7.

As illustrated in FIG. 8, in the state in which the scanner unit 103 is closed, the fitting shaft 105a is pressed to the end of a depression portion 106a formed in the holding case 106 by the urging force of the spring 108. The scanner unit 103 is raised from this state to be revolved around the rotating shaft 103b. As illustrated in FIG. 10, the three points of the rotating shaft 104a of the holder 104, the fitting shaft 105a of the rod 105, and the rotating shaft 103b of the scanner unit 103 thereupon align on a straight line. When the scanner unit 103 moves across the position (switching position) further to the upper direction, the sliding force of the rod 105 owing to the reaction force of the spring 108 begins to operate on the scanner unit 103 to revolve to the upper direction. The moment caused by the operating force is gradually increasing. Consequently, the moment around the rotating shaft 103b owing to the weight of the scanner unit 103 is gradually reduced, and then the scanner unit 103 can be opened gradually by a smaller operating force.

In the state in which the scanner unit 103 is completely opened as illustrate in FIG. 9, the spring force of the spring 108 is set so that the moment around the rotating shaft 103b caused by the elastic force of the spring 108 may be larger than the moment caused by the self-weight of the scanner unit 103. By setting the spring force in this way, the scanner unit 103 can be held at the opened position thereof illustrated in FIG. 9 by the upward force of the rod 105 caused by the spring 108. In this state, a user can perform a desired maintenance operation through the opened portion of the upper part of the recording unit 120.

When the scanner unit 103 is being pushed down from the opened position of FIG. 9 to be closed, the scanner unit 103 reaches the switching position, where the rotating shaft 104a of the holder 104, the fitting shaft 105a of the rod 105, and the rotating shaft 103b of the scanner unit 103 align on the straight line as illustrated in FIG. 10, in the process of the closing. From the opened position to the arrival at the switching position, the reaction force of the spring 108 operates on the scanner unit 103 into the direction to open the scanner unit 103. Consequently, the damper unit 110 operates on the scanner unit 103 so as not to be rapidly closed.

When the scanner unit 103 is revolved into the closing direction across the switching position of FIG. 10, the reaction force of the spring 108 begins to operate on the scanner unit 103 into the closing direction thereof. The force into the closing direction becomes larger as the scanner unit 103 approaches the closed position illustrated in FIG. 8. Consequently, the scanner unit 103 is accelerated into rapid closing direction, and a shock operating on the recording unit 120 when the scanner unit 103 is closed becomes large.

The holding case 106 having the aforesaid depression portion 106a receiving the fitting shaft 105a of the rod 105 is provided for preventing such a shock. That is, the holding case 106 is adapted so that the fitting shaft 105a of the rod 105 abuts against the inner part of the depression portion 106a of the holding case 106 in the neighborhood of the switching position where the operating direction of the spring 108 is switched. By the abutting against the inner part of the depression portion 106a, the force operating on the scanner unit 103 into the closing direction thereof is dispersed, and the scanner unit 103 is decelerated while moving to the closed position of FIG. 8. In the closed state of the scanner unit 103, the reaction force of the spring 108 operates on the scanner unit 103 through the rod 105 so as to press the scanner unit 103 downward. Consequently, the scanner unit 103 is held in a locked state at the closed position thereof by the holding of the fitting shaft 105a of the damper unit 110 in the depression portion 106a of the holding case 106.

However, in the configuration mentioned above, when the weight of the scanner unit 103 becomes large, the urging force of the spring 108 of the damper unit 110 is needed to be accordingly increased in order to hold the scanner unit 103 in the opened state. If the operating force into the opening direction is increased, the force into the closing direction is also increased similarly. Consequently, the aforesaid method of dispersing the spring force by abutting the fitting shaft 105a of the rod 105 against the depression portion 106a of the holding case 106 cannot obtain a necessary and sufficient buffering effect. That is, the buffering effect sufficient for fully decreasing the speed of the scanner unit at the time of closing the scanner unit cannot be obtained, and the scanner unit ends up colliding with the recording unit at a considerable speed. Consequently, it has been difficult to reduce or avoid the shock at the closed position.

In such a situation, there is a disadvantage that a user gets his or her hand stuck in the scanner unit 103 or that the apparatus is damaged by the vigorous moving of the scanner unit 103 up to the closed position thereof. Moreover, if another buffering unit for buffering the movement of the scanner unit 103 before the closed position thereof is provided in order to avoid the disadvantage like this, then there arises the disadvantage that enlargement in size of the apparatus main body and the increase in cost of the apparatus are bring about.

SUMMARY OF THE INVENTION

It is an object of the present invention to provide an image reading and recording apparatus capable of obtaining a sufficient buffering effect at the time of opening and closing independently of the weight of a scanner unit. Moreover, it is another object of the present invention to provide an image reading and recording apparatus capable of obtaining the function of locking a scanner unit at a closed position, the assist function of reducing an opening force, the function of holding the scanner unit at an opened position, and the buffering function at the time of closing.

It is a further object of the present invention to provide an image reading and recording apparatus including: a recording unit; a scanner unit rotatable to the recording unit; a damper unit disposed between the recording unit and the scanner unit, the damper unit including a holder coupled to the recording unit, a rod movable to the holder in an expansion and contraction direction, and a spring mounted between the holder and the rod to produce a spring force in a direction of pushing out the rod, wherein an operating direction of the spring switches while the scanner unit moves from an opened position thereof to a closed position thereof to the recording unit; a projection disposed on the rod; and a guiding surface disposed on the recording unit to abut against the projection, wherein the projection abuts against the guiding surface before the operation direction of the spring switches in process of a scanner unit's movement from the opened position thereof to the closed position thereof.

Further features of the present invention will become apparent from the following description of exemplary embodiments with reference to the attached drawings.

DESCRIPTION OF THE EMBODIMENTS

Figure 1:
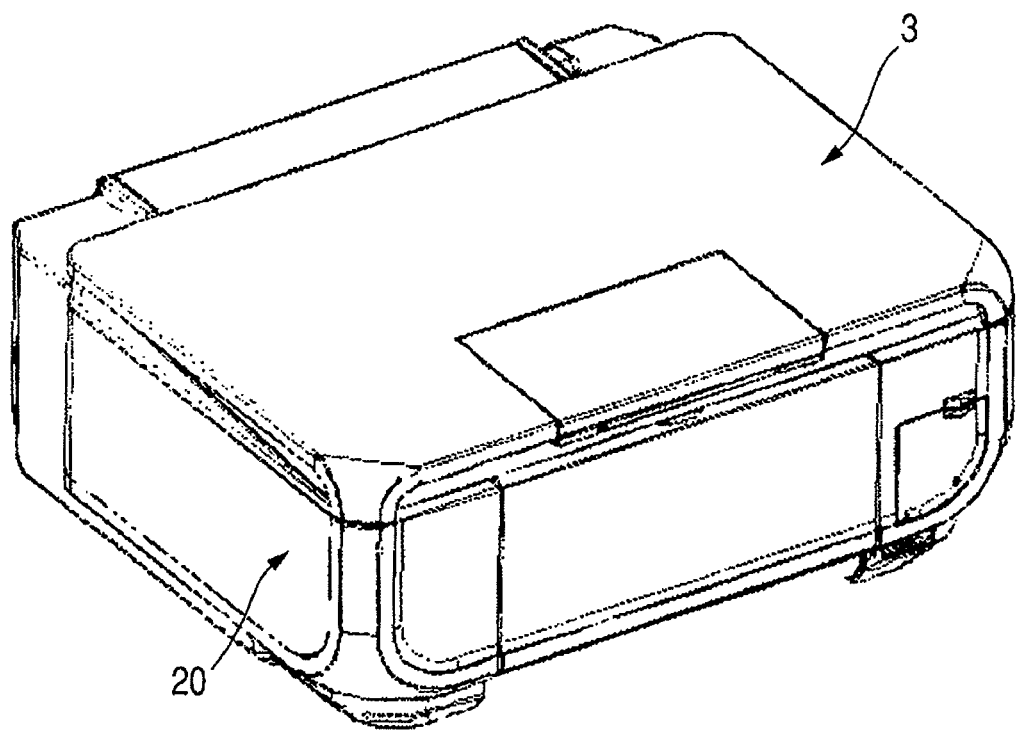
FIG. 1 is a perspective view illustrating the external appearance of an exemplary embodiment of an image reading and recording apparatus according to the present invention.
Figure 2:
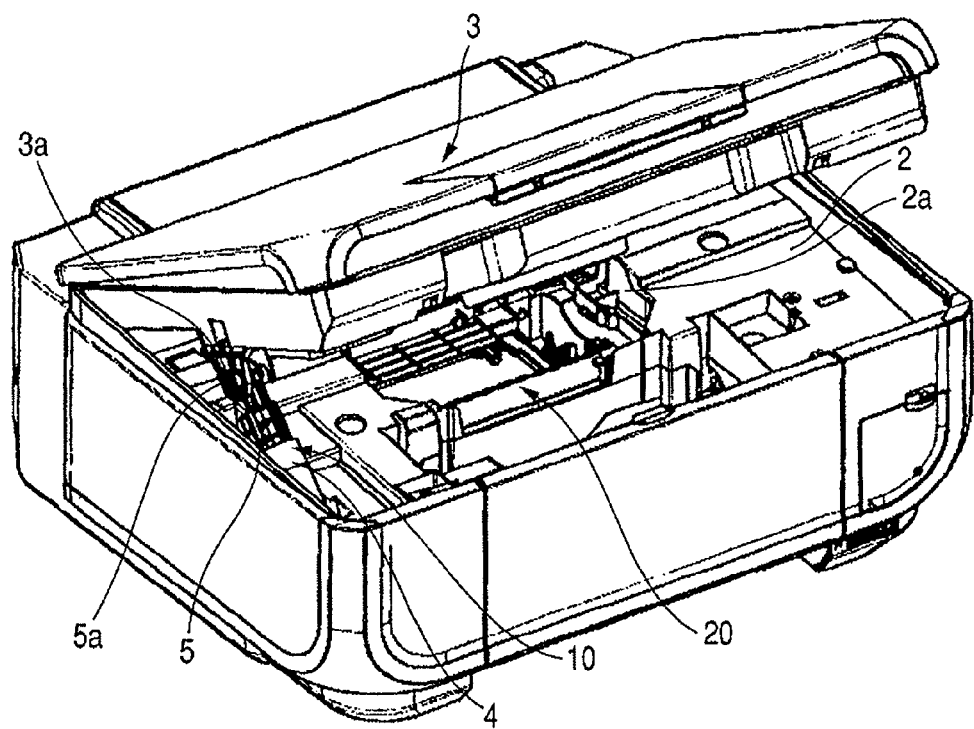
FIG. 2 is a perspective view illustrating a state in which a scanner unit of the image reading and recording apparatus according to the present invention is opened.
Figure 3:
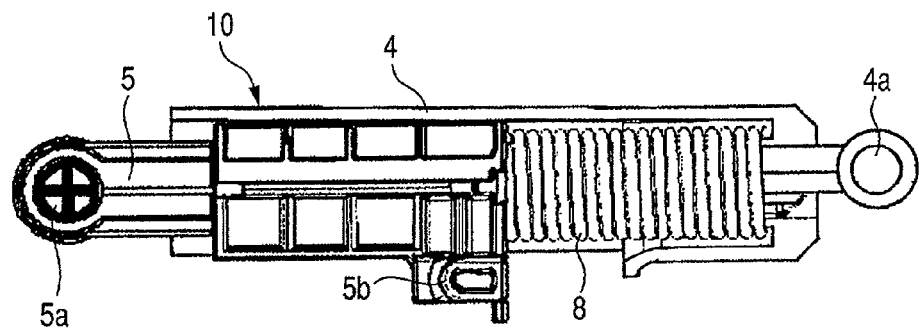
FIG. 3 is a sectional view in an expansion and contraction direction that illustrates the structure of a damper unit of the image reading and recording apparatus.

In the following, an exemplary embodiment of the present invention will be concretely described with reference to the attached drawings. Incidentally, the same marks indicate the same or corresponding parts in common to all drawings.

In FIGS. 1, 2, 3, 4, 5 and 6, an image reading and recording apparatus includes a recording unit 20, a scanner unit 3 attached to the recording unit 20 in a rotatable state, and a damper unit 10 coupled between the recording unit 20 and the scanner unit 3. The recording unit 20 is composed of a recording apparatus recording an image on a recording material, such as recording paper, with a recording head based on image information, for example. The scanner unit 3 constitutes a cover unit for closing an opened portion 2a (see FIG. 2) for the maintenance of the recording unit 20. The scanner unit 3 reads an image of an original with a reading unit such as a CCD.

The upper part of the recording unit 20 is composed of a housing-like frame 2. The scanner unit 3 is revolvably attached to the frame 2 of the recording unit 20 with a rotating shaft 3b. The opened portion 2a at the upper part of the recording unit 20 is an opening for performing maintenance such as an exchange of a recording head or an ink tank and the removal of a recording material that has caused a paper jam. The damper unit 10 is coupled between the frame 2 of the recording unit 20 and the bottom of the scanner unit 3.

The damper unit 10 has a structure in which a spring 8 for buffering is retractably mounted between a holder 4 and a rod 5, which are assembled so that they each can slide in the expansion and contraction direction. A holding case 6 for revolvably holding the base of the damper unit 10 is fixed to the frame 2 in the upper part of the recording unit 20. The holder 4 is rotatably supported with the shaft portion 4a by a bearing portion 6c of the holding case 6. The rod 5 is coupled with the bottom of the scanner unit 3 with the shaft (fitting shaft) 5a of the rod 5 being fit with a hole, or an opening, (fitting hole) 3a of the scanner unit 3. The damper unit 10 includes the holder 4, which is a first member coupled with the recording unit 20, and the rod 5, which is a second member movable to the holder 4 in the expansion and contraction direction. Moreover, the damper unit 10 includes the compression spring 8, which is mounted between the holder 4 and the rod 5 to produce a spring force in the direction of pushing out the rod 5.

A fitting hole 3a of the scanner unit 3 is formed in a long hole, and a fitting shaft 5a of the rod 5 is fitted to the fitting hole 3a in the state of being slidably movable and rotatable. That is, the rod 5 is coupled with the bottom of the scanner unit 3 with the fitting shaft 5a fitted to the fitting hole 3a with a back-lash to be relatively movable. The spring 8 urges the rod 5 toward the scanner unit 3 into the direction of pushing out the rod 5 from the holder 4. Accordingly, the rod 5 is provided with a projection 5b abutting on a guiding surface 7 of the holding case 6 in a depressed state in a predetermined range on the closing side when the scanner unit 3 is opened or closed. That is, the guiding surface 7 is formed as an inclined plane of a depression portion 6b formed in the holding case 6 on the left side (on the side of the fitting shaft 5a of the rod 5) in the figures, and the projection 5b of the rod 5 slides on the guiding surface 7 in the depressed state of the projection 5b within a predetermined revolving range of the scanner unit 3 including the closed position thereof when the damper unit 10 revolves upward or downward with an opening movement or a closing movement of the scanner unit 3.

Figure 4:
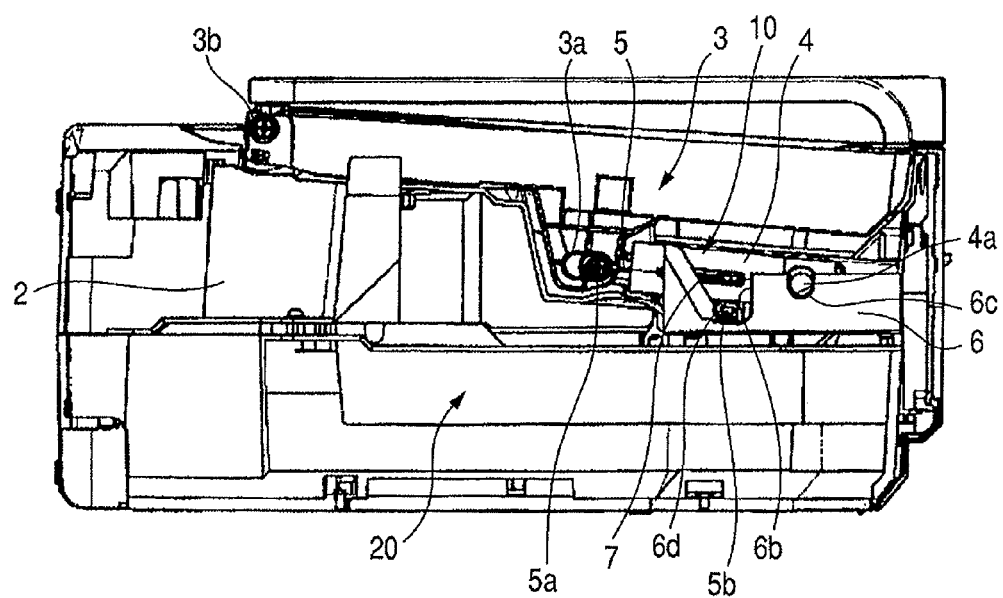
FIG. 4 is a side view illustrating a state of the image reading and recording apparatus when the scanner unit is closed.
Figure 6:
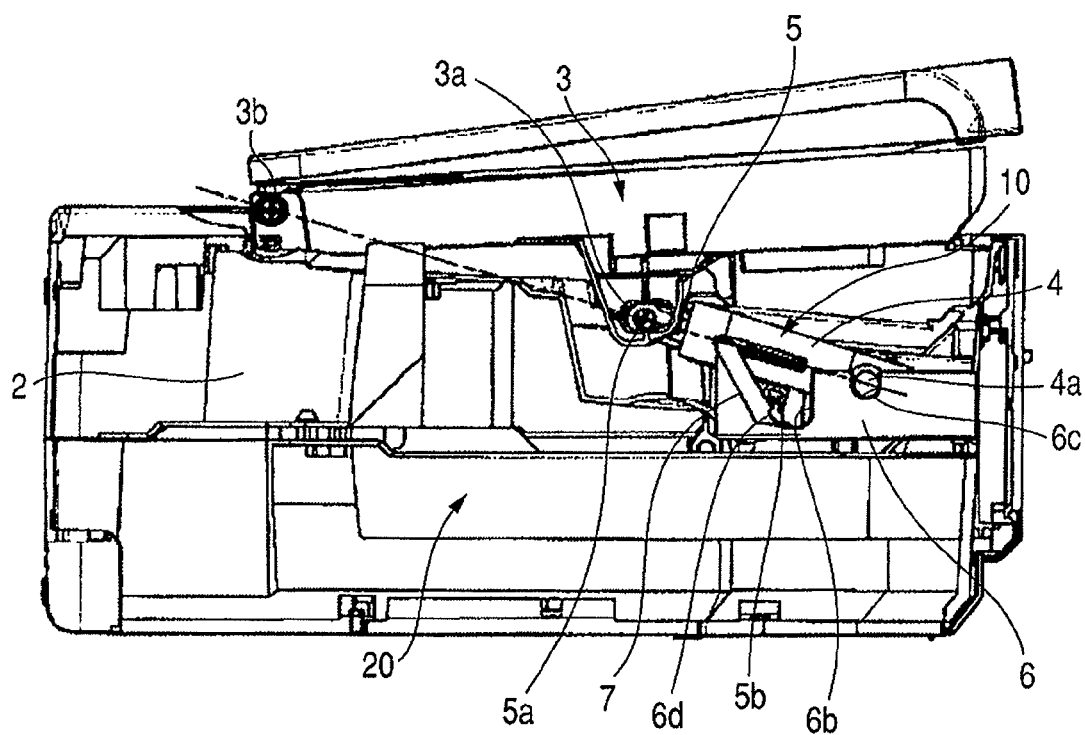
FIG. 6 is a side view illustrating a state of the image reading and recording apparatus in process of opening and closing the scanner unit.
Figure 7:
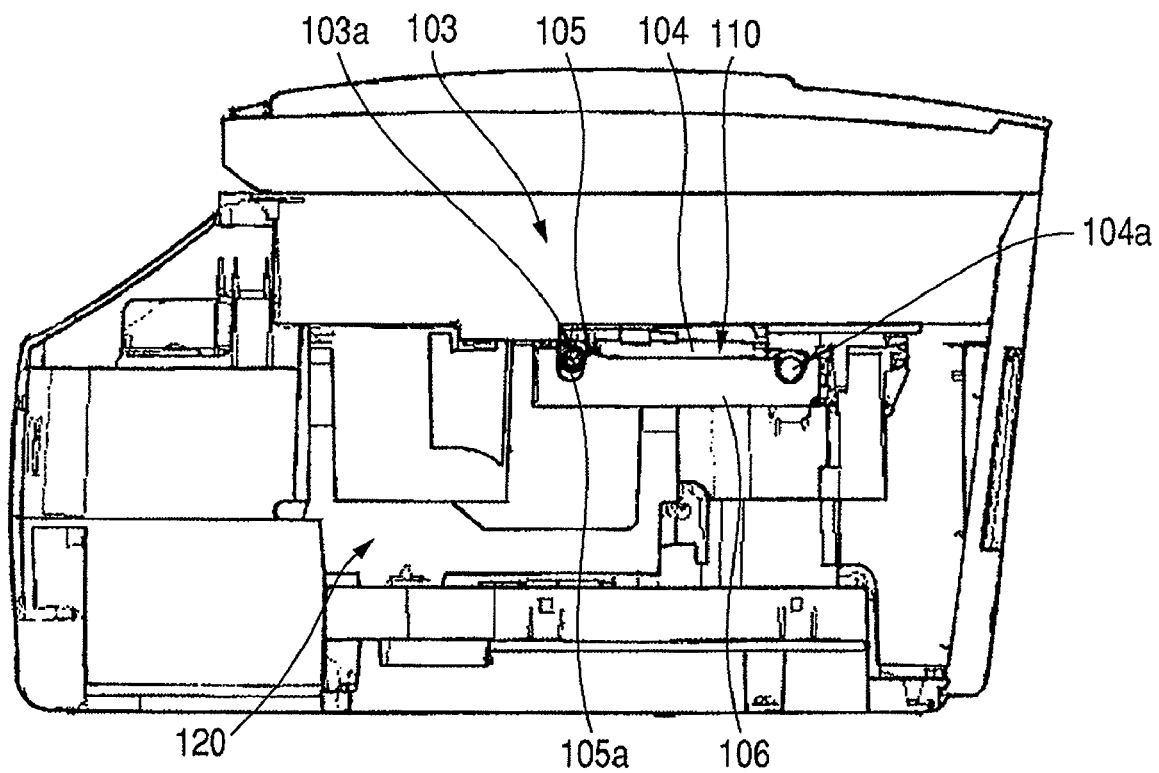
FIG. 7 is a side view illustrating the state in which the scanner unit of a conventional image reading and recording apparatus is closed.
Figure 8:
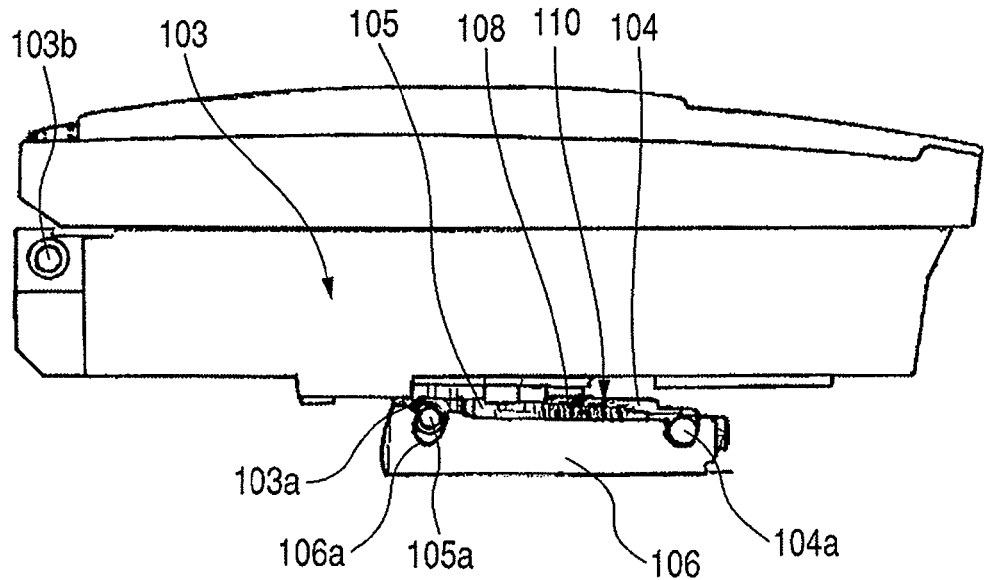
FIG. 8 is a side view illustrating a state of the damper unit of the conventional image reading and recording apparatus when the scanner unit is closed.
Figure 9:
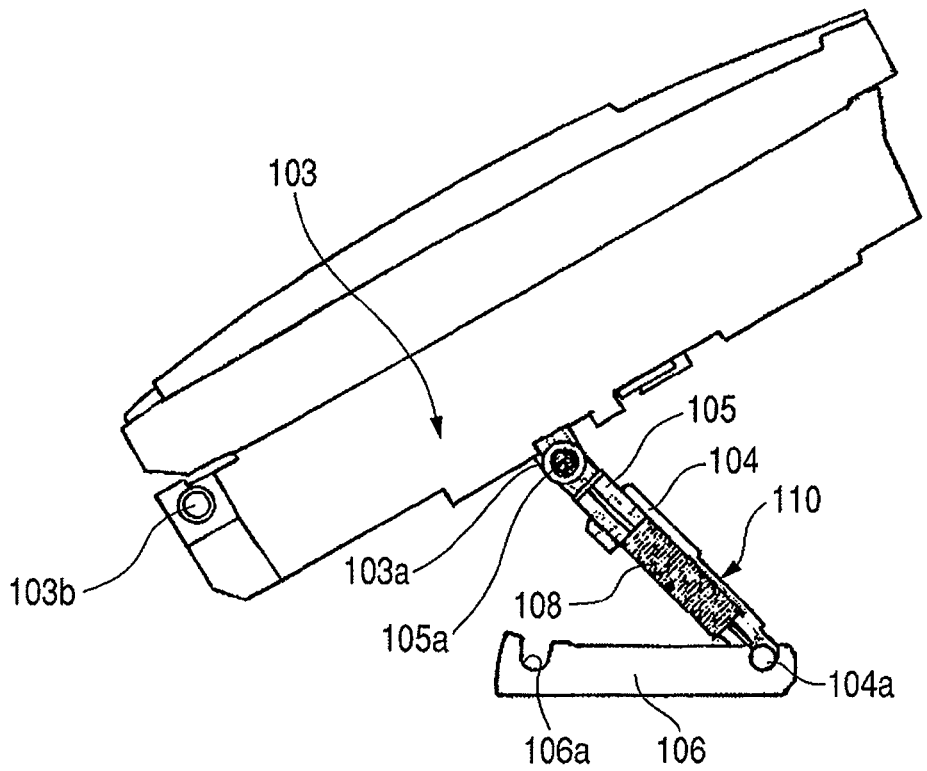
FIG. 9 is a side view illustrating the state of the damper unit when the scanner unit is opened.
Figure 10:
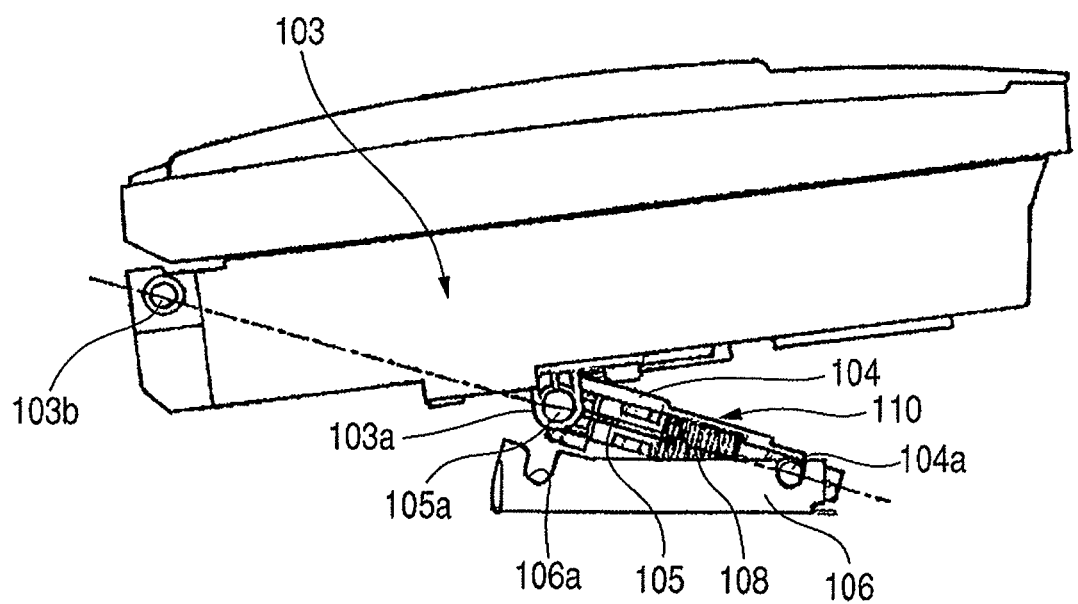
FIG. 10 is a side view illustrating a state of the damper unit in process of opening the scanner unit.

As illustrated in FIG. 4, when the scanner unit 3 is at the closed position thereof, the projection 5b of the rod 5 is held in the state of being pressed to the inner part of the holding case 6 by the spring 8. The projection 5b of the rod 5 is in the state of having moved to the rightmost side in the figure (to the side of the shaft portion 4a of the holder 4) by the guiding surface 7 in the state in which the scanner unit 3 is closed. Consequently, the spring force of the spring 8 is the maximum at this time. When the scanner unit 3 is located at a revolving position in a certain range including the closed position, as illustrated in FIGS. 4 and 6, the projection 5b is pressed to the guiding surface 7 of the holding case 6 by a strong spring force of the spring 8. Accordingly, the holding case 6 is made of a metallic material having a high rigidity lest the holding case 6 should be deformed by the spring force.

However, if the holding case 6 is made of a metallic material, a large frictional force is produced between the projection 5b of the rod 5 and the guiding surface 7 of the holding case 6 when the scanner unit 3 moves from the closed position thereof to the opening direction and when the scanner unit 3 moves from the opened position thereof into the closing direction. Moreover, because the roughness of a metallic plate or the like generally lacks stability, there is the possibility of producing large differences among parts in terms of their operating forces, their damper effects, and their durability owing to their dispersion among the parts. In order to settle the problem like this, the guiding surface 7 of the holding case 6 is formed to be a surface having a surface layer excellent in slidability. For example, it is desirable to perform the processing of forming a surface layer having a quality of material excellent in slidability and durability, such as a polyoxymethylene (POM) resin, to the guiding surface 7. The dispersion of the parts can be thereby suppressed, and the configuration of the opening and the closing mechanism of the scanner unit 3 can be adapted to have a stable operating force, a sufficient buffering function, and sufficient durability.

In the present exemplary embodiment, a hollow place 6d is formed on the lower side of the guiding surface 7, and the projection 5b of the rod 5 is pushed into the hollow place 6d when the scanner unit 3 is at the closed position thereof. Consequently, the scanner unit 3 is held in a locked state, in which the scanner unit 3 is not easily opened even if an upward force is operated thereon. Incidentally, because the fitting hole 3a of the scanner unit 3 is formed in a long hole, the fitting shaft 5a of the rod 5 is fitted to the fitting hole 3a with a certain gap between them even in the state in which the scanner unit 3 is closed.

When the scanner unit 3 is raised upward from the closed position of FIG. 4, the projection 5b of the rod 5 slips out of the hollow place 6d on the guiding surface 7, and the locked state is released. When the scanner unit 3 is further raised by a predetermined height, as illustrated in FIG. 6, the shaft portion 4a of the holder 4, the fitting shaft 5a of the rod 5, and the rotating shaft 3b of the scanner unit 3 become the state of aligning on one straight line. In the state of aligning on the one straight line, the operating direction of the spring 8 of the damper unit 10 to the scanner unit 3 is inverted from a clockwise moment to a counterclockwise moment around the rotating shaft 3b. That is, the operating direction of the spring 8 switches at the revolving position of the scanner unit 3 where the shaft portion 4a, the fitting shaft 5a, and the rotating shaft 3b align on the one straight line as illustrated in FIG. 6. That is, the damper unit 10 is disposed so that the operating direction of the spring 8 switches in a range in which the scanner unit 3 moves between the closed position thereof and the opened position thereof.

When the scanner unit 3 is opened, the scanner unit 3 moves upward across the switching position. The rod 5 thereupon slides in the expansion direction by the spring 8, and the scanner unit 3 begins to receive an upward (opening direction) operating force, i.e. the counterclockwise moment around the rotating shaft 3b in the figure. When the moment like this operates, the moment into the closing direction of the scanner unit 3 caused by the weight thereof is reduced, and the scanner unit 3 can be opened by a small operating force. Consequently, the damper unit 10 carries out the assist function of reducing the operating force for opening the scanner unit 3 when the scanner unit 3 is opened.

Figure 5:
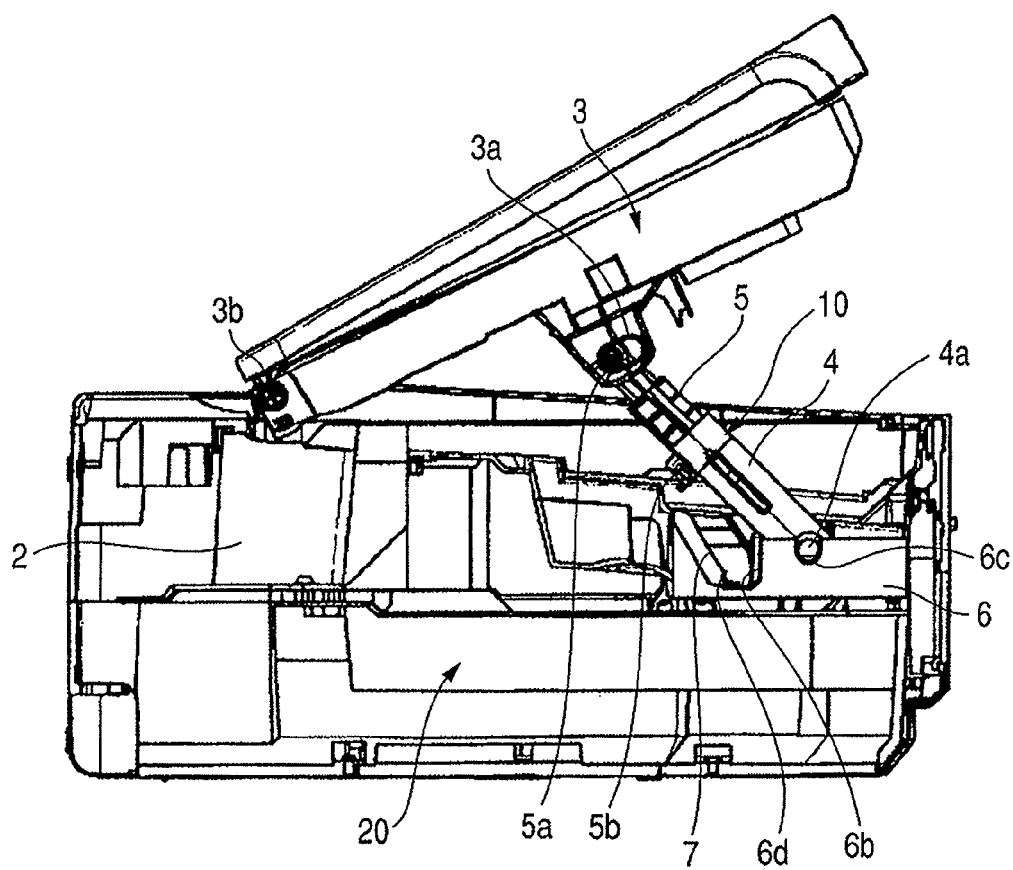
FIG. 5 is a side view illustrating a state of the image reading and recording apparatus when the scanner unit is opened.

In the state in which the scanner unit 3 is opened as illustrated in FIG. 5, the moment of the spring 8 around the rotating shaft 3b (the counterclockwise moment in the figure) is set to be larger than the moment caused by the self-weight of the scanner unit 3 (the clockwise moment in the figure). Thereby, the scanner unit 3 can be held at the opened position thereof, and a user can access the inside of the recording unit 20 through the opened portion 2a (see FIG. 2) even if a special mechanism for holding the scanner unit 3 is not provided. For example, the user can perform the maintenance of the recording unit 20, such as the exchange of a recording head or an ink tank and the removal of a paper jam.

When the scanner unit 3 is closed, the scanner unit 3 is pressed down from the opened state thereof illustrated in FIG. 5 while the scanner 3 is being closed. At the time of closing the scanner 3, the spring force operates on the scanner unit 3 in the direction of opening the scanner 3 until the scanner 3 reaches the position where the shaft portion 4a of the holder 4, the fitting shaft 5a of the rod 5, and the rotating shaft 3b of the scanner unit 3 align on one straight line as illustrated in FIG. 6, i.e. the position where the operating direction of the spring force of the spring 8 switches.

According to the present exemplary embodiment, the projection 5b of the rod 5 abuts on the guiding surface 7 of the holding case 6 before the scanner 3 reaches the position illustrated in FIG. 6 and the direction of the moment around the rotating shaft 3b caused by the reaction force of the spring 8 switches. The projection 5b then begins to slide on the guiding surface 7, being depressed onto the guiding surface 7. Consequently, braking power (damping power) is applied to the closing operation of the scanner unit 3 before the force into the closing direction of the scanner unit 3 by the reaction force of the spring 8 begins to operate on the scanner unit 3. Sufficient buffering operation (a damper effect) can be thereby obtained when the scanner unit 3 moves into the closing direction thereof and when the scanner unit 3 reaches the closed position.

Moreover, the back-lash is formed between the fitting shaft 5a of the rod 5 and the fitting hole (long hole) 3a of the scanner unit 3. Consequently, by abutting the projection 5b of the rod 5 on the guiding surface 7 of the holding case 6, the transmission of the spring force of the spring 8 from the rod 5 to the scanner unit 3 can be released while the rod 5 is moved against the spring force of the spring 8. That is, after the projection 5b of the rod 5 has abutted on the guiding surface 7 of the holding case 6 before the passing of the switching point at the time of closing the scanning unit 3, the abutting between the fitting shaft 5a of the rod 5 and the fitting hole 3a of the scanner unit 3 is released, and no reaction force of the spring 8 is transmitted to the scanner unit 3. In this way, the image reading and recording apparatus is adapted not to generate the force in the direction of closing the scanner unit 3 even if the operating direction of the spring 8 switches.

As described above, in the present exemplary embodiment, when the scanner unit 3 is closed, the projection 5b abuts on the guiding surface 7 before the operating direction of the spring force of the spring 8 switches, and thereby the rod 5 is moved against the spring force. At the same time, the transmission of the spring force from the rod 5 to the scanner unit 3 is released. Consequently, when the scanner unit 3 is closed, it is prevented for the scanner unit from being accelerated by the reaction force of the spring 8 to move to the closing position thereof, and the disadvantage that the scanner unit 3 vigorously collides with the recording unit 20 can be eliminated.

According to the exemplary embodiment described above, there is provided an image reading and recording apparatus that can obtain a sufficient buffering effect at the time of the opening and the closing of the scanner unit 3 independent of the weight of thereof with a simple configuration of using only the one damper unit 10. At the same time, the image reading and recording apparatus can obtain the function of locking the closed position of the scanner unit 3, the assist function of reducing the opening force of the scanner unit 3, the function of holding the scanner unit 3 in the opened position thereof, and the buffering function of buffering the scanner unit 3 at the time of closing the scanner unit 3.

While the present invention has been described with reference to exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2006-226350, filed Aug. 23, 2006, which is hereby incorporated by reference herein in its entirety.

What is claimed is:

1. An image reading and recording apparatus comprising:
a recording unit;
a scanner unit disposed to be rotatable to the recording unit;
a damper unit disposed between the recording unit and the scanner unit, the damper unit including a holder coupled to the recording unit, a rod movable to the holder in an expansion and contraction direction, and a spring mounted between the holder and the rod to produce a spring force in a direction of pushing out the rod, wherein an operating direction of the spring switches while the scanner unit moves from an opened position thereof to a closed position thereof to the recording unit;
a projection disposed on the rod; and
a guiding surface disposed on the recording unit to abut against the projection,
wherein the projection abuts against the guiding surface before the operation direction of the spring switches in process of a scanner unit's movement from the opened position thereof to the closed position thereof.

2. The image reading and recording apparatus according to claim 1, wherein maintenance of the recording unit is enabled by opening the scanner unit to the recording unit.

3. The image reading and recording apparatus according to claim 1, wherein the rod is coupled with the scanner unit by fitting of a shaft and a hole with a back-lash.

4. The image reading and recording apparatus according to claim 1, wherein a shaft of the holder is rotatably supported by a holding case disposed in the recording unit.

5. The image reading and recording apparatus according to claim 4, wherein the guiding surface is formed on the holding case.

6. The image reading and recording apparatus according to claim 5, wherein the holding case is made of a metal, and the guiding surface includes a surface layer excellent in slidability.

7. The image reading and recording apparatus according to claim 1, wherein the recording unit performs recording to a recording material by discharging ink from a recording head.

* * * * *